Oct. 23, 1956   S. SIEGEL   2,767,467
SOLID PHASE BONDING OF METAL STRIPS
Filed Feb. 2, 1951
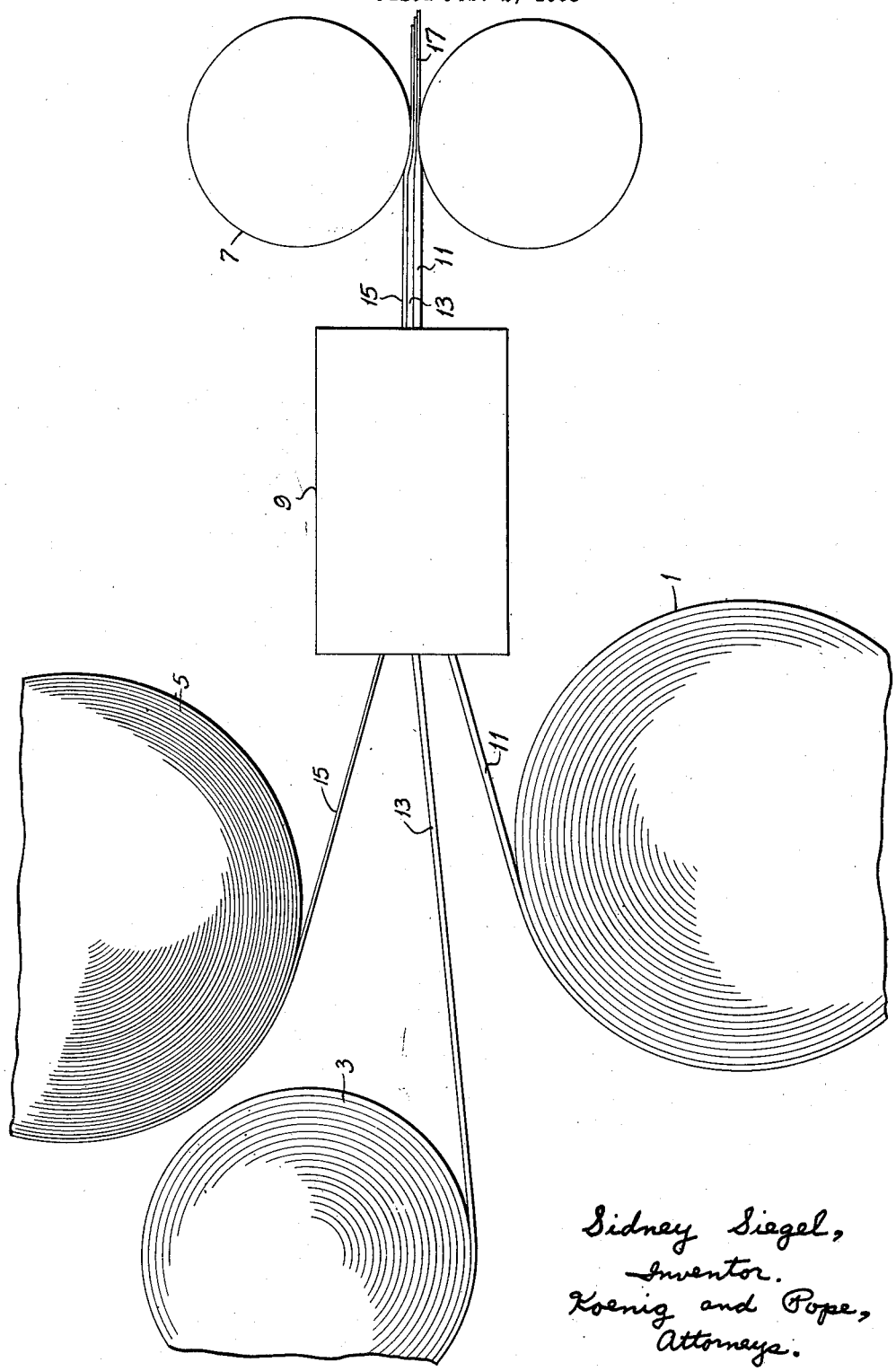
Sidney Siegel,
Inventor.
Koenig and Pope,
Attorneys.

2,767,467

SOLID PHASE BONDING OF METAL STRIPS

Sidney Siegel, Attleboro, Mass., assignor to Metals & Controls Corporation, Attleboro, Mass., a corporation of Massachusetts Application February 2, 1951, Serial No. 209,036

1 Claim. (Cl. 29—497.5)

This invention relates to the continuous solid phase bonding of metal strips to form composite metal strip, and more particularly to the manufacture by solid phase bonding techniques of composite metal strip comprising layers of different malleable metals wherein at least one layer is to be of considerable thickness. The term "metal" is used herein in its broad sense including alloys.

The invention pertains to the manufacture of composite metal strips comprising at least two layers of two different malleable metals by continuous solid phase bonding techniques involving rolling with a considerable reduction in thickness where the layer of one of the metals in the as-bonded composite strip is to be of such thickness that, while it might be supplied as a single strip of said one metal, such single strip would be of too great a thickness to permit it readily to be supplied in long lengths and in a condition, such as in coil form, convenient for processing.

By "solid phase bonding" I mean bonding without the formation of any liquid phase interfacial material. For disclosures as to solid phase bonding techniques applicable in carrying out this invention, reference is made to the coassigned copending application of Helmich W. Boessenkool and George Durst, entitled Solid Phase Bonding of Metals, Serial No. 204,346, filed January 4, 1951, eventuated as Patent No. 2,691,815, dated October 19, 1954, and the coassigned copending application of Helmich W. Boessenkool, George Durst and myself entitled Solid Phase Bonding of Metals, Serial No. 204,646, filed January 5, 1951, eventutated as Patent No. 2,753,623, dated July 10, 1956.

For example, if it is desired to manufacture a composite strip of steel and another metal where the percentage of reduction required to effect bonding is such as to require putting in an initial thickness of 0.250 inch of steel, it would be in many cases uneconomical and impractical to start with a single strip of steel of this thickness since such a strip is too thick readily to be supplied in long lengths in a form convenient for processing, for example, in a coil. Preferably, it is desirable for utmost economy to work with long length coils of metal strip.

The object of this invention is to make possible and economical the use of long lengths of strip in the manufacture of composite strip by continuous solid phase bonding, even though the as-bonded thickness of the layer of one metal is such as would be prohibitive to starting with a single strip of said one metal thin enough to be supplied in long lengths such as can be provided in coil form.

I have found that I can start with a plurality of strips of the one metal, each thin enough to be easily handled in the first place, and thus adapted to be supplied in individual long lengths, as for example, in coil form, with the combined thickness of the plurality of these strips such as to provide the desired final thickness of the layer of said one metal in the as-bonded composite strip, provided I roll all the strips together under such conditions as to effect bonding together of the strips of said one metal, one to another, and bonding of the strip of the other metal to the adjacent strip of said one metal. Other features will be in part apparent and in part pointed out hereinafter.

The invention accordingly comprises the steps and sequence of steps, and features of manipulation, which will be exemplified in the methods hereinafter described, and the scope of the application of which will be indicated in the following claim.

In the accompanying drawing, in which one of various possible embodiments of the invention is illustrated, the single figure is a diagrammatic view in side elevation illustrating metal strips being rolled in accordance with the invention.

Referring to the drawing, reference characters 1 and 3 designate coils of strips of one and the same metal, and reference character 5 designates a coil of a strip of another and different metal. Reference character 7 designates the work rolls of a rolling mill, and reference character 9 generally designates strip-treating apparatus for treating the strips unwinding from the coils and travelling toward the mill. Strips designated 11 and 13 unwind from coils 1 and 3 and are brought together with one another and with strip 15 unwinding from coil 5 prior to entering the rolls 7. Each of strips 11, 13 and 15 is thin enough readily to have been wound into the coils 1, 3 and 5. However, if a single strip having a thickness equal to the combined thickness of strips 11 and 13 were used, such strip would be too thick to be coiled readily. Rolling is effected with such a reduction in thickness and at such a temperature as to cause the three strips to become solid phase bonded, strips 11 and 13 of the one metal becoming solid phase bonded one to the other and strip 15 becoming solid phase bonded to the adjacent strip 13 of said one metal, to issue from the rolls as the composite strip designated 17. This composite strip consists of a layer of the one metal made up of the metal from the two strips 11 and 13 and a layer of the other metal from the strip 15. Each of strips 11, 13 and 15 is, of course, reduced in thickness by the rolling.

The bonding may be carried out in accordance with the technique disclosed in the above-mentioned patents, wherein will also be found examples of reductions necessary to effect bonding either at low temperatures or at elevated temperatures. According to the method disclosed in Serial No. 204,346, the contacting surfaces of the metal strips are meticulously cleaned to remove barrier films which would otherwise act as a deterrent to bonding. This includes the removal of gross contaminants, and then a further cleaning to remove such films as long chain polar molecules, natural oxide and compound films (usually hydrated), and chemisorbed layers and adsorbed layers of liquids and gases. Removal of barrier film is preferably accomplished by wire brushing the surfaces. Then the strips are rolled at a temperature in the cold working range (below the minimum recrystallization temperature of the metal having the lowest recrystallization temperature of the several materials being bonded) with such a percentage of reduction, usually above 30%, as to effect the formation of nucleal bonds, i. e., numerous minute discrete bonded areas, in each of which there is a metallic bond existing by virtue of the inter-atomic force field surrounding metal atoms. Then the nucleally bonded material is heated or sintered in order to effect a lateral growth or spread of the area of the bonds to increase the over-all strength of the bonding. It is preferred to sinter at temperatures above the recrystallization temperature of the metal having the lowest recrystallization temperature and below the temperature at which, for the particular combination of metals being sintered, brittle intermetallic compounds or liquid phases would form.

According to the method disclosed in Serial No. 204,646, the contacting surfaces of the metal strips are cleaned, and the metals are then heated to an elevated temperature within a range having as its lower limit the minimum recrystallization temperature of the metal having the lowest recrystallization temperature and as its upper limit the temperature at which one of the metals would pull apart when worked (hot-short temperature) or the temperature at which brittle compounds or liquid phase material would form at the interfaces, whichever is lower. The metals are heated in a protective atmosphere. Then they are rolled together with such a percentage of reduction consistent with the temperatures as to effect a bonding of the metals by nucleal bonds the same as above described. Finally, the nucleally bonded material is sintered as above described to increase the bond strength.

In the case of low temperature bonding, the strip-treating apparatus 9 generally indicated in the drawing will be an apparatus for removing barrier film from all the strip surfaces which are to come into contact. In the case of elevated temperature bonding, the strip-treating apparatus 9 will be a furnace. It will be understood that the percentage of reduction, in conjunction with whatever temperature is used, is such as to insure bonding not only of strip 15 to strip 13 but also to insure bonding of strip 13 to strip 11. Thus, if it should take a greater reduction to bond strips 11 and 13 together than to bond strips 15 and 13 together, such greater reduction would be used, and this will of course effect bonding of strips 15 and 13.

By utilizing the two strips 11 and 13, instead of a single strip having a thickness equal to the combined thickness of strips 11 and 13, each of strips 11 and 13 being thin enough readily to be coiled, whereas the single strip would have been too thick to be readily coiled, it is possible to start entirely with long lengths in coils instead of short straight lengths. The composite stock 17, due to the reduction effected for bonding, will usually also be thin enough to be coiled. It will be understood that, where necessary or desirable, more than two thin strips of the same metal may be used to make up the thickness of said metal required in the as-bonded stock, and also that a plurality of strips of each of two or more different metals may be bonded in the manner described.

The following examples illustrate the invention.

A composite strip 4 inches wide and 0.101 inch thick consisting of approximately .017 inch of copper on approximately .084 inch of aluminum was made by solid phase bonding two aluminum strips each 4 inches wide and 0.120 inch thick and a strip of copper 4 inches wide and 0.050 inch thick at room temperature with a 65% reduction, all three strips being supplied from tight-wound coils.

A composite strip 4 inches wide and 0.108 inch thick consisting of approximately 0.025 inch of fine silver on 0.083 inch of SAE 1010 steel was made by solid phase bonding three steel strips each 4 inches wide and 0.083 inch thick and a strip of fine silver 0.075 inch thick at room temperature with a 67% reduction, all four strips being supplied from tight-wound coils.

Note that as to the first of the above examples, if a single strip of aluminum had been used, it would have had to be 0.240 inch thick, which is too thick conveniently to be coiled. As to the second, if a single strip of steel had been used, it would have had to be 0.250 inch thick, which is too thick conveniently to be coiled.

In view of the above, it will be seen that the several objects of the invention are achieved and other advantageous results attained.

As many changes could be made in the above methods without departing from the scope of the invention, it is intended that all matter contained in the above description or shown in the accompanying drawing shall be interpreted as illustrative and not in a limiting sense.

I claim:

The method of manufacturing a composite metal strip to comprise bonded layers therein of at least two different malleable metals with at least one of said metals of such thickness in the composite strip as to preclude starting of the process with a single length of said one metal thin enough readily to be coiled, comprising bringing together a plurality of individual strips of said one metal each of which strips is thin enough to be and is supplied from a coil thereof and at least one other strip of said other metal which is also thin enough to be and is supplied from a coil, with the adjacent strips of all of said metals in mutual contact, treating the adjacent surfaces of all of the strips to be contacted prior to contact substantially to eliminate any bond deterrent film such as long chain polar molecules, natural oxide and compound films, chemisorbed layers, adsorbed layers of liquids and gases, squeezing together the strips at such a temperature and with such a reduction in thickness as to effect with concurrent increase in area thereof the simultaneous formation between each of said strips of said group and between one strip of the group and the adjacent strip of a multitude of discrete bonds with the over-all bond strength of said discrete bonds being sufficient for handling all of the strips as a partially bonded composite strip, the strength of said bonds between at least one pair of said strips being substantially less than the strength of a complete continuous solid phase bond between said one pair, and heating all of the components held together by said bonds at a temperature lying within the range which extends from approximately the recrystallization temperature of the metal having the lowest recrystallization temperature to one of those temperatures, whichever is the lower as the case may be, at which liquid phase material or a brittle intermetallic compound would form in appreciable amount, said heating being continued for such a length of time as to effect growth of the bonds thereby substantially to increase the over-all bond strength.

References Cited in the file of this patent

UNITED STATES PATENTS

| | | |
|---|---|---|
| 1,043,576 | Eldred | Nov. 5, 1912 |
| 1,130,077 | Eldred | Mar. 2, 1915 |
| 1,667,787 | Jaeger | May 1, 1928 |
| 2,414,511 | Dyar | Jan. 21, 1947 |
| 2,438,759 | Liebowitz | Mar. 30, 1948 |
| 2,484,118 | Reynolds | Oct. 11, 1949 |
| 2,522,408 | Sowter | Sept. 12, 1950 |
| 2,539,246 | Hensel | Jan. 23, 1951 |
| 2,558,093 | Kinney | June 26, 1951 |
| 2,691,815 | Bossenkool et al. | Oct. 19, 1954 |

OTHER REFERENCES

Solid Phase Welding, Adams Lecture by A. B. Kinzel, published December 1944, in Welding Journal by American Welding Society, pages 1124–1145.

Tylecotte, R. F.: "Pressure Welding of Light Alloys Without Fusion," Transactions of Institute of Welding, November 1945, pages 163–178.

Observations on Solid Phase Bonding, George Durst, January 1947, pages 97–101, Metal Progress.

Cady, E. L.: "When Metal Atoms Wander," from "Scientific American," July 1947, pages 15–17.

Ball, J. G.: "Welding Metallurgy," from "Metals Industry," September 12, 1947, pages 219–227.

Material Joined by New Cold Welding Process, by A. B. Sowter, February 1949, published Welding Journal, pages 149–152.

Kelley, F. C.: "Pressure Welding" from "Welding Journal," August 1951, pages 728–736.